(12) United States Patent
Varadarajan et al.

(10) Patent No.: US 7,720,325 B2
(45) Date of Patent: May 18, 2010

(54) OPTICAL TURNAROUND SYSTEM

(75) Inventors: Harini Varadarajan, Missouri City, TX (US); Scott A. Rubinstein, League City, TX (US); Rogerio T. Ramos, Eastleigh (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/147,650

(22) Filed: Jun. 27, 2008

(65) Prior Publication Data

US 2009/0022451 A1    Jan. 22, 2009

Related U.S. Application Data

(62) Division of application No. 11/779,376, filed on Jul. 18, 2007, now Pat. No. 7,428,350.

(51) Int. Cl.
*G02B 6/00* (2006.01)
(52) U.S. Cl. .......................................... 385/13; 385/12
(58) Field of Classification Search ................... 385/12, 385/13
See application file for complete search history.

(56) References Cited

U.S. PATENT DOCUMENTS

| | | | | |
|---|---|---|---|---|
| 4,650,278 A * | 3/1987 | Maciejko et al. | ............... | 385/73 |
| 4,753,500 A * | 6/1988 | Guazzo | ............... | 385/69 |
| 4,878,492 A * | 11/1989 | Sinofsky et al. | ............... | 606/7 |
| 4,900,121 A * | 2/1990 | Becker et al. | ............... | 385/135 |
| 5,138,676 A * | 8/1992 | Stowe et al. | ............... | 385/32 |
| 5,163,988 A * | 11/1992 | Setaishi et al. | ............... | 65/402 |
| 5,268,986 A * | 12/1993 | Kakii et al. | ............... | 385/135 |
| 5,348,019 A * | 9/1994 | Sluss et al. | ............... | 600/480 |
| 5,717,811 A * | 2/1998 | Macken | ............... | 385/135 |
| 5,894,540 A * | 4/1999 | Drewing | ............... | 385/135 |
| 5,921,916 A * | 7/1999 | Aeikens et al. | ............... | 600/108 |
| 5,923,807 A * | 7/1999 | Wild | ............... | 385/135 |
| 5,929,381 A * | 7/1999 | Daoud | ............... | 174/72 A |
| 6,112,006 A * | 8/2000 | Foss | ............... | 385/135 |
| 6,456,381 B1 * | 9/2002 | Nakamura et al. | ............... | 356/483 |
| 6,846,286 B2 * | 1/2005 | Suzuki et al. | ............... | 600/145 |
| 6,983,796 B2 * | 1/2006 | Bayne et al. | ............... | 166/278 |
| 7,269,320 B2 * | 9/2007 | Herbst | ............... | 385/100 |
| 2002/0183592 A1 * | 12/2002 | Suzuki et al. | ............... | 600/145 |
| 2002/0196447 A1 * | 12/2002 | Nakamura et al. | ............... | 356/483 |
| 2006/0104578 A1 * | 5/2006 | Herbst | ............... | 385/100 |
| 2006/0215971 A1 | 9/2006 | Ramos | | |
| 2007/0293748 A1 * | 12/2007 | Engvall et al. | ............... | 600/371 |

FOREIGN PATENT DOCUMENTS

DE    19621797    * 12/1997

(Continued)

*Primary Examiner*—K. Cyrus Kianni
(74) *Attorney, Agent, or Firm*—Rodney V. Warfford; Daryl R. Wright; Robert VanSomeren PC

(57) ABSTRACT

A technique is provided for utilizing an optical fiber in a variety of sensing applications and environments by beneficially routing the optical fiber. A continuous optical fiber is created to provide optical continuity between two ends of the optical fiber. The optical continuity is created with the assistance of an optical turnaround constructed in a simple, dependable form able to control the bend of the optical fiber as it extends through the optical turnaround.

6 Claims, 4 Drawing Sheets

FOREIGN PATENT DOCUMENTS

| | | |
|---|---|---|
| DE | 19621797 A1 | 12/1997 |
| GB | 2404017 A | 1/2005 |
| JP | 2006250840 A | 9/2006 |
| WO | 03076887 A1 | 9/2003 |
| WO | 2005014976 A1 | 2/2005 |
| WO | 2006114410 A1 | 11/2006 |

* cited by examiner

OPTICAL TURNAROUND SYSTEM

RELATED APPLICATION

This application is a divisional of U.S. patent application Ser. No. 11/779,376, filed Jul. 18, 2007, and entitled "OPTICAL TURNAROUND SYSTEM."

BACKGROUND

Optical fibers are used in a variety of sensing and other applications. For example, optical fiber has been used as a distributed temperature sensor in oilfield applications where the temperature profile can be applied in, for example, detection of water breakthrough, detection of leaks, and gas lift monitoring and optimization. The optical fiber is utilized by injecting light into the fiber, measuring the backscattered light, and then processing the results to determine temperature along the length of the fiber.

Research has shown that distributed temperature sensor measurements are more accurate when performed in a double-ended configuration such that optical continuity exists between two optical fiber ends connected to a distributed temperature sensor control system. By preparing this double-ended configuration, light can be sent through the complete length of optical fiber from both directions and measurement correction is facilitated. However, the double-ended configuration requires that a continuous optical fiber extend down into a wellbore for the desired interval to be sensed, turnaround, and return to the surface.

Attempts have been made to create turnarounds that route the optical fiber back to the surface. In one example, the turnaround has been formed with a metal tube doubled back on itself with both ends connected to additional tubing. The optical fiber is then routed through the tubing. This technique, however, requires many tubing connections that reduce system reliability while increasing deployment time. Many applications also are subject to space constraints which can create problems in properly controlling the bend of the optical fiber when routed through a turnaround. Exceeding the minimum bend radius of an optical fiber increases optical attenuation and can ultimately result in fiber breakage.

SUMMARY

In general, the present invention provides a system and method for routing an optical fiber that can be used in a variety of sensing applications and environments. A continuous optical fiber is created such that optical continuity exists between two ends of the optical fiber. The optical continuity is created with the assistance of an optical turnaround constructed in a simple, dependable form able to control the bend of the optical fiber as it extends through the optical turnaround.

BRIEF DESCRIPTION OF THE DRAWINGS

Certain embodiments of the invention will hereafter be described with reference to the accompanying drawings, wherein like reference numerals denote like elements, and.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to a fiber optic system that utilizes an optical fiber in parameter sensing applications. The system utilizes optical fiber arranged in a double-ended configuration to provide optical continuity between two fiber ends that are connected to an appropriate control unit. The configuration facilitates sensing of the desired parameter by, for example, allowing light to be sent through the complete length of the optical fiber from both directions. The arrangement also facilitates measurement correction to provide for more accurate measurement of the desired parameter. In one embodiment, the fiber optic system is utilized in a well environment and the optical fiber is deployed in a wellbore drilled into a geological formation holding desired production fluids, such as hydrocarbon based fluids.

Figure 1:
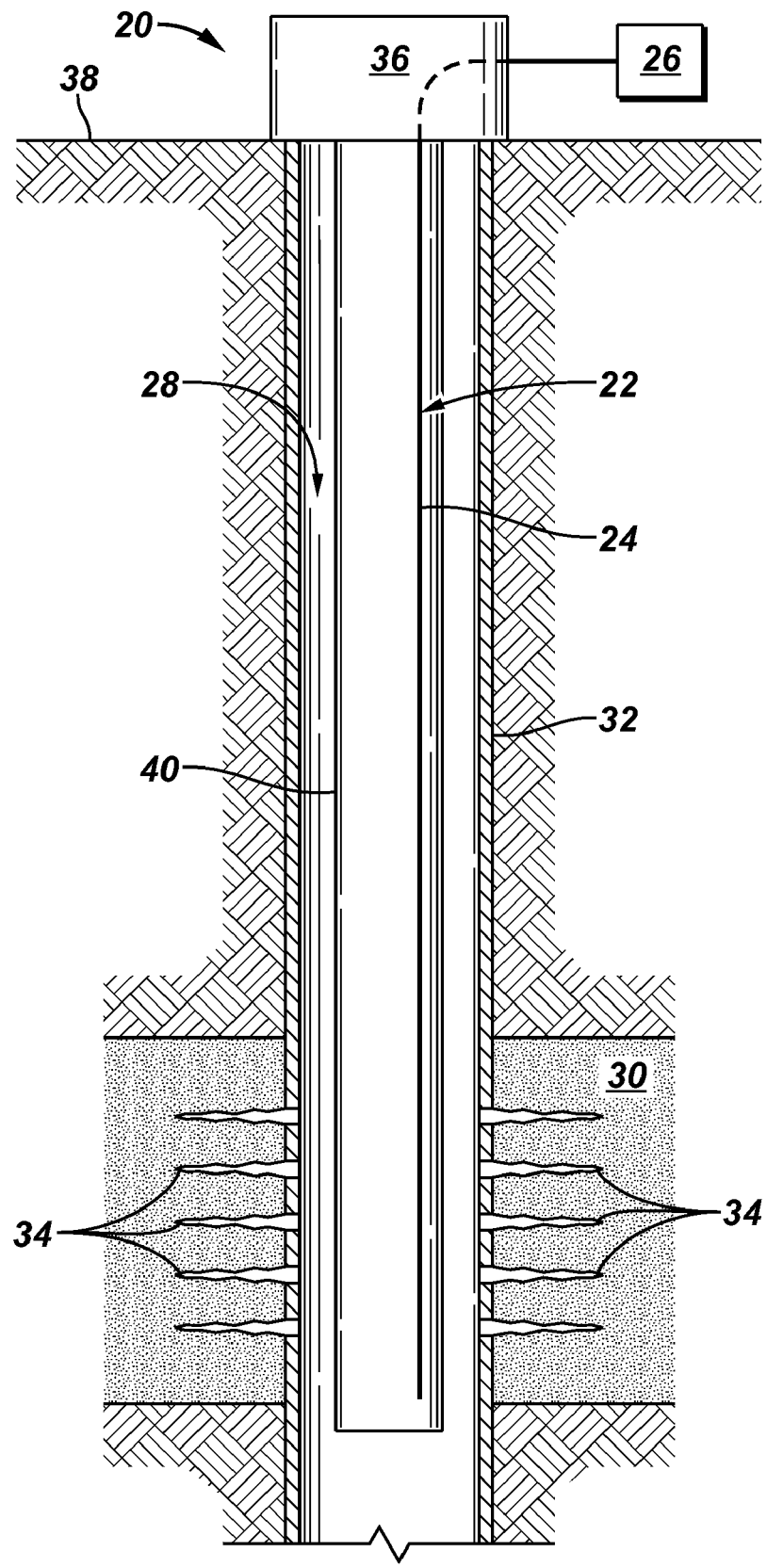
FIG. 1 is a front elevation view of a fiber optic system positioned in a wellbore with a corresponding well system, according to an embodiment of the present invention.

Referring generally to FIG. 1, a fiber optic system 20 is illustrated according to one embodiment of the present invention. Fiber optic system 20 comprises an optical fiber sensor 22 that may comprise a distributed sensor 24 coupled to an appropriate control unit 26. The control unit 26 may be selected from a variety of available optical control systems used to inject light along optical fiber. The control unit 26 is then used to measure the backscattered light and to process the results to determine the sensed parameter, e.g. temperature, along the length of the optical fiber. Temperature profiles can be used in well applications to evaluate a variety of formation and well equipment related characteristics, such as water breakthrough, leak detection, and gas lift monitoring and optimization.

In the embodiment illustrated in FIG. 1, fiber optic system 20 is utilized in a well related application with the control unit 26 positioned generally at a surface location and optical fiber sensor 22 extending into a wellbore 28. Wellbore 28 may be formed in a geological formation 30 holding desired production fluids, such as hydrocarbon based fluids that may be in the form of oil or gas. In many applications, wellbore 28 is lined with a wellbore casing 32 through which perforations 34 are formed to enable the flow of fluids between geological formation 30 and wellbore 28. In this application, wellbore 28 extends downwardly from a wellhead 36 positioned at a surface 38, e.g. the surface of the earth or a seabed floor.

Optical fiber sensor 22 may be routed along wellbore equipment 40, e.g. a tubing string, deployed in wellbore 28. The wellbore equipment 40 may comprise a variety of wellbore completions, servicing tools or other equipment depending on the well related operation to be performed. Furthermore, the optical fiber sensor 22 can be routed within wellbore equipment 40, along the exterior of wellbore equipment 40, along the interior or exterior of wellbore casing 32, or along a combination of regions. The optical fiber sensor 22 is designed to sense the desired parameter, e.g. temperature, along wellbore 28 or along a specific section of wellbore 28.

Figure 2:
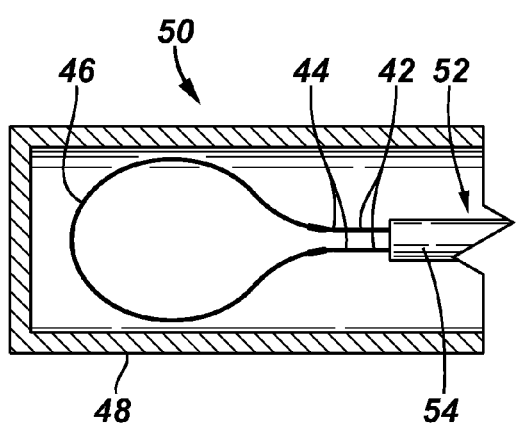
FIG. 2 is a view of an optical fiber loop that may be adjusted in size within a protective housing, according to an embodiment of the present invention.

The optical fiber sensor 22 comprises a plurality of optical fibers 42, as illustrated in FIG. 2. The optical fibers 42, e.g. a pair of optical fibers 42, have ends 44 which are connected by an optical fiber loop 46 to provide optical continuity extending between optical fibers 42. The optical fiber loop 46 is functionally connected to ends 44 by fusion welding or other suitable connection processes that enable the establishment of optical continuity. In the example illustrated, optical fiber loop 46 is a high strength fiber segment that is packaged in a protective housing 48. The fiber loop 46 is packaged in a manner that protects it during shipment and also from downhole environmental conditions once installed. The protective housing 48, optical fiber loop 46 and related packaging comprise a fiber loop optical turnaround 50. In this embodiment, the fiber loop optical turnaround 50 farther comprises an adjustment device 52 provided to allow selective adjustment of optical fiber loop size. By way of example, adjustment device 52 may comprise a sleeve 54, e.g. a tube, slidably mounted over optical fibers 42. By sliding sleeve 54 toward or away from optical fiber loop 46, the diameter of the loop can be adjusted to facilitate, for example, movement into protective housing 48 and subsequent expansion to the greatest diameter possible as limited by the inside diameter of protective housing 48.

Proper selection of a suitable optical fiber with which to form optical fiber loop 46 can be accomplished by a variety of methods. For example, lengths of optical fiber may be acquired for use in the optical turnaround 50 through a combination of testing and statistical flaw distribution. The optical fiber can be selected so as to have a statistical probability of sufficiently high strength to reliably form the optical fiber loop. In one example, lengths of optical fiber are taken from a batch of select fiber and subdivided into three sections or lengths. One length of fiber is set aside for use as optical fiber loop 46, while the other lengths of optical fiber are tested to determine tensile strength/break load. If the strength of the tested lengths of fiber is sufficient to avoid experiencing damaging stress levels when creating a loop size needed for the optical turnaround, the set aside optical fiber is presumed suitable for use in forming loop 46. Only a statistically insignificant probability exists that the set aside fiber has differing characteristics compared to those of the tested optical fibers. An alternative approach is to select the optical fiber for forming loop 46 from a fiber spool that is batch tested. A single test is performed on a sample of the fiber to verify strength. Additionally, through the use of appropriate optical fiber during manufacture of an optical fiber cable, it is feasible to create optical fiber loop 46 by exposing a sufficient length of optical fiber from the cable so that one of the fibers can be looped and fusion spliced to a second fiber in the cable. It should be noted that in some embodiments optical fiber loop 46 and optical fibers 42 can be formed from one continuous fiber. Use of these analysis and selection methods enables the determination of optical fiber having high strength for use in the optical turnaround. By locating suitable high strength fiber through selective/random testing and/or statistical/historical data, the optical fiber can be bent in a small diameter while still ensuring long-term reliability. The turnarounds discussed herein also can be formed with relatively short optical fiber loops, e.g. one meter or less, which further reduces the probability of defects in the optical fiber turnaround.

Figure 3:
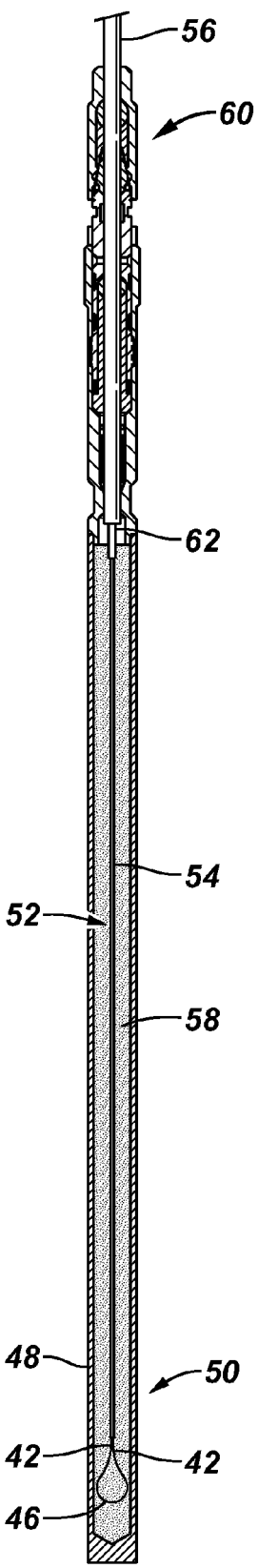
FIG. 3 is a view of the optical fiber loop illustrated in FIG. 2 combined with a seal assembly positioned to seal the protective housing to an optical fiber cable, according to an embodiment of the present invention.

Referring to FIG. 3, one embodiment of fiber loop optical turnaround 50 is illustrated as combined with an optical fiber cable 56 to form optical fiber sensor 22. In this embodiment, optical fiber loop 46 is established at the end of optical fiber cable 56 and isolated from direct contact with the well environment by housing 48. Housing 48 also protects optical fiber loop 46 and optical fibers 42 from vibration and shock that may be incurred during installation of optical fiber sensor 22 and during service within wellbore 28. Additionally, a potting compound 58 can be introduced into the interior of housing 48 to further protect the optical fibers and optical fiber loop. In one embodiment, housing 48 is partially filled with potting compound to secure optical fiber loop 46 within housing 48 after proper installation of the optical fiber loop.

The housing 48 is sealed to optical fiber cable 56 to ensure fiber loop 46 and fibers 42 are isolated from direct contact with the surrounding well environment. In the embodiment illustrated, housing 48 and optical fiber cable 56 are sealed together by a suitable cable seal assembly 60, such as an in-line splice. However, other methods of cable seating can be used. One example of a suitable seal assembly, illustrated in FIG. 3, is an Intellitite Dry-Mate Connector (EDMC-R) available from Schlumberger Corporation.

Construction of fiber loop optical turnaround 50 can be carried out according to several methodologies. One suitable approach involves initially preparing optical fiber cable 56 by stripping back the encapsulation material, straightening the cable, and holding the optical fiber cable via an appropriate assembly fixture or other mechanism. The cable seal assembly 60 is then slid onto optical fiber cable 56, as illustrated in FIG. 3. Typically, the optical fiber cable 56 has a metal jacket which is removed for a length, and any filler material is stripped away to expose optical fibers 42. Sleeve 54, which may be in the form of a polyimide tube, is then slid over optical fibers 42 and inserted into optical fiber cable 56 until only a small length of the tube remains exposed. The optical fiber loop 46 is then functionally coupled to the ends 44 of optical fibers 42 by, for example, a fusion splice. Housing 48 can then be at least partially filled with potting compound 58 to secure the fiber loop 46. Subsequently, sleeve 54 is slid toward optical fiber loop 46 until the loop is small enough to be inserted into housing 48, and housing 48 is moved over the optical fiber loop 46 until the loop clears any restrictions. Sleeve 54 is then slid a short distance back into optical fiber cable 56 to allow fiber loop 46 to expand to, for example, the full inside diameter of housing 48. A connection end 62 of housing 48 is moved over optical fiber cable 56 and into engagement with cable seal assembly 60 so that a seal can be formed between housing 48 and optical fiber cable 56.

Formation of the optical fiber turnaround in this manner avoids the addition of a variety of components into the overall tubing string. For example, no mandrels or shrouds are required to mount and protect the optical turnaround. Protection of optical turnaround 50 is achieved through the systems and procedures described above, resulting in significant cost savings.

Figure 4:
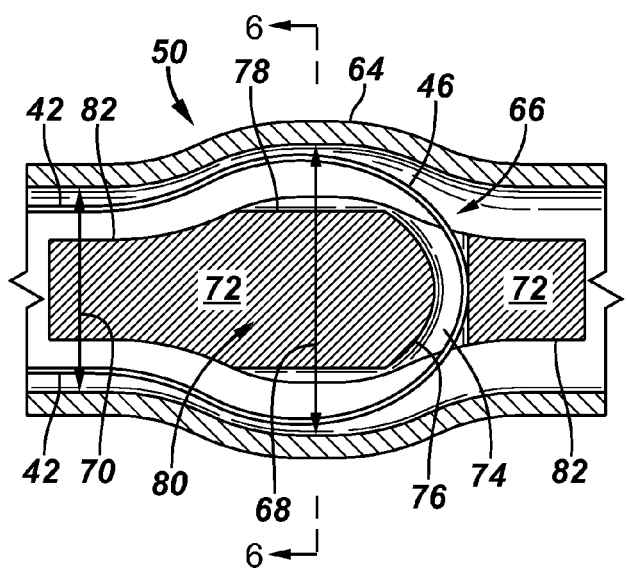
FIG. 4 is a cross-sectional view of an optical fiber turnaround, according to an alternate embodiment of the present invention.
Figure 6:
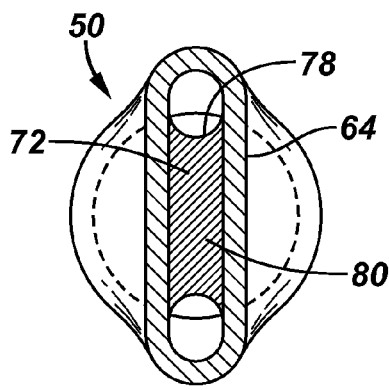
FIG. 6 is a cross-sectional view of the optical fiber turnaround taken generally along line 6-6 in FIG. 4, according to an embodiment of the present invention.
Figure 5:
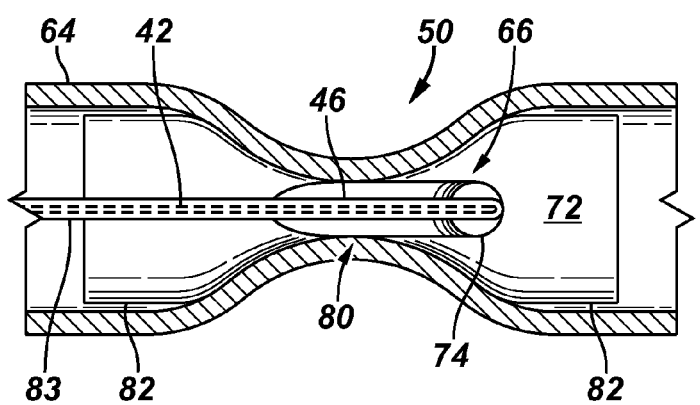
FIG. 5 is a cross-sectional view of the optical fiber turnaround illustrated in FIG. 4 but rotated ninety degrees, according to an embodiment of the present invention.

An alternate embodiment of optical turnaround 50 is illustrated in FIGS. 4-6. In this embodiment, a single tube 64 is used for routing optical fibers 42 and optical fiber loop 46. It should be noted that optical fibers 42 and fiber loop 46 can all be part of a single optical fiber routed through the optical turnaround 50.

As illustrated in FIG. 4, the tube 64 is deformed to create an optical fiber turnaround region 66 having a span 68 greater than the undeformed internal diameter 70 of tube 64. The deformation of tube 64 to create turnaround region 66 also enables the use of an optical fiber loop 46 having a diameter greater than the internal diameter 70 of tube 64. In the embodiment illustrated, tube 64 comprises a deformable, metal tube. The tube 64 is pinched or otherwise deformed from its exterior to create span 68 in one direction and a narrower structure in the perpendicular direction, as further illustrated in FIGS. 5 and 6.

The optical fiber turnaround 50 illustrated in FIGS. 4-6 also can be combined with an insert 72 that is inserted into tube 64 so that it resides in optical fiber turnaround region 66. The insert 72 is sized to receive optical fiber and to hold optical fiber loop 46. The insert 72 also is sized to support tube 64 in optical fiber turnaround region 66 (see FIG. 6) to prevent the tube from further collapsing under external pressure.

In creating this embodiment of optical fiber turnaround 50, insert 72 is initially placed within tube 64 at the desired optical fiber turnaround region 66. An appropriate pressing tool is then used to pinch tube 64 from the outside to reduce its dimension in the direction of pinching and to increase its dimension in the opposite or perpendicular direction. The wall of tube 64 is pinched until it touches insert 72 which allows the insert 72 to support tube 64 against further collapse. The extremities of tube 64 on one or both sides of optical fiber turnaround region 66 can remain undeformed to enable connection to other tubes or to enable termination using suitable pipe termination fittings.

Figure 7:
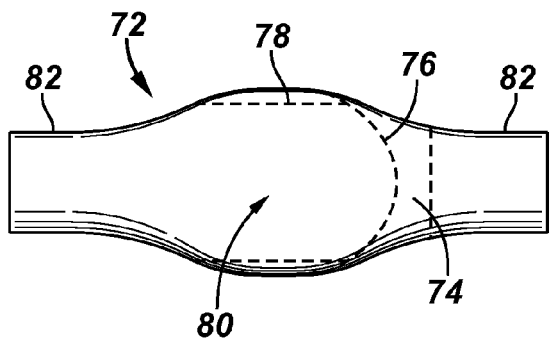
FIG. 7 is a front view of an embodiment of an insert that may be used in the turnaround illustrated in FIG. 4, according to an embodiment of the present invention.
Figure 8:
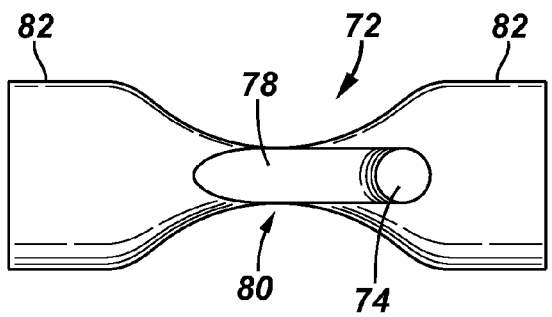
FIG. 8 is a top view of the insert illustrated in FIG. 7, according to an embodiment of the present invention.

As further illustrated in FIGS. 7 and 8, insert 72 may comprise a passage 74 through which optical fiber loop 46 extends. The passage 74 may have a curved portion 76 or other suitably shaped portion to enable the optical fiber loop to be placed inside tube 64 in a desired shape and curvature. Furthermore, curved portion 76 may be formed with a trough 78, when viewed in cross-section, to hold and protect the optical fiber loop 46. By way of example, insert 72 also may comprise a generally flat midsection 80 positioned between a pair of a larger ends 82, as illustrated best in FIG. 8.

The optical fiber loop 46 can be formed by allowing a single optical fiber 42 to be routed through passage 74 and around at least a portion of insert 72 until it is allowed to turn around and extend back up through tube 64. The diameter of the optical fiber loop is larger than the inside diameter 70 of tube 64 and may, for example, be in the range of more than 1 and less than 1.57 times the inside diameter 70. In many applications, a suitable diameter for optical fiber loop 46 is in the range of 1.1 to 1.4 times larger than the inside diameter 70 of tube 64.

In some embodiments, optical fiber loop 46 and the optical fiber sections 42 extending from loop 46 can be further protected by an auxiliary sheath or tube 80 disposed around the optical fiber. The auxiliary tube 80 can be made from appropriate, flexible materials including polytetrafluoroethylene (PTFE) or thin-walled metal.

Figure 9:
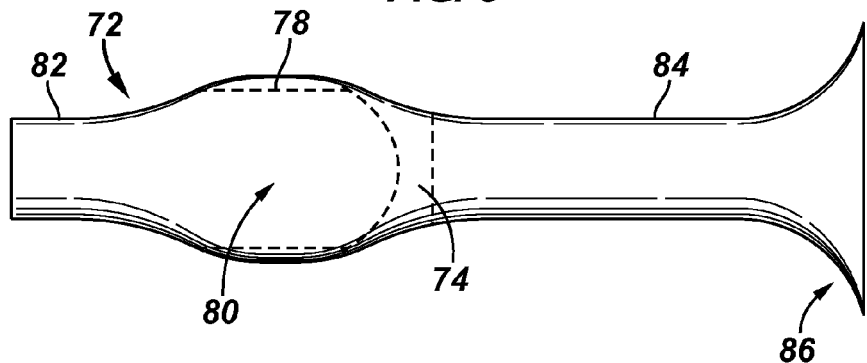
FIG. 9 is a front view of another embodiment of an insert that may be used in the turnaround illustrated in FIG. 4, according to an alternate embodiment of the present invention.
Figure 10:
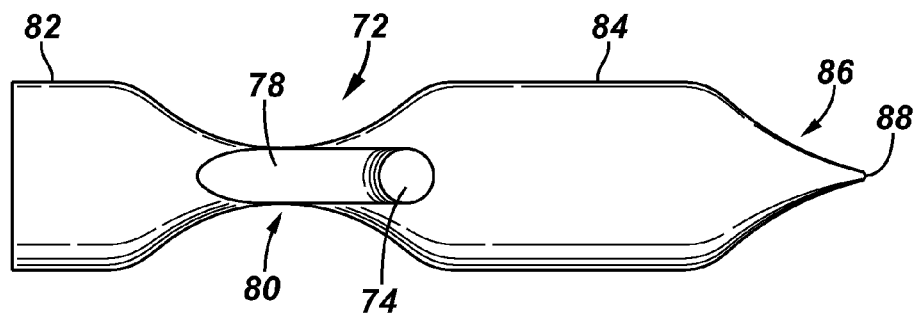
FIG. 10 is a top view of the insert illustrated in FIG. 9, according to an alternate embodiment of the present invention.

Another embodiment of insert 72 is illustrated in FIGS. 9 and 10. This latter embodiment is similar to the embodiment described with respect to FIGS. 7 and 8, but it includes a lengthened section 84, as best illustrated in FIG. 9. A distal end 86 of section 84 is collapsed on itself (see FIG. 10) to enable the end of the insert and/or the end of tube 64 to be closed. Distal end 86 can be sealed by a linear weld 88 or other suitable sealing mechanism.

The embodiments of optical turnaround 50 can be formed from a variety of materials and components. Additionally, the optical turnarounds 50 can be used to facilitate construction of a variety of optical fiber sensor systems that are used in many environments and applications. The optical fiber sensor system and turnaround are suited to well related applications, but the system and methodology also can be applied in other applications.

Accordingly, although only a few embodiments of the present invention have been described in detail above, those of ordinary skill in the art will readily appreciate that many modifications are possible without materially departing from the teachings of this invention. Such modifications are intended to be included within the scope of this invention as defined in the claims.

What is claimed is:

1. A system to enable optical continuity for enhancing optical fiber sensing, comprising:
    an optical fiber cable having optical fibers;
    an optical fiber loop functionally coupled to ends of a pair of the optical fibers;
    an optical fiber housing positioned over the optical fiber loop and sealed with respect to the optical fiber cable; and
    a device positioned to adjust the size of the optical fiber loop, the device being disposed around the optical fibers and slidable along the optical fibers.

2. The system as recited in claim 1, wherein the optical fiber loop is fusion spliced to the ends of the optical fibers.

3. The system as recited in claim 1, wherein the device comprises a tube.

4. The system as recited in claim 3, wherein the tube is a polyimide tube.

5. The system as recited in claim 1, further comprising a potting compound in the optical turnaround housing to secure the optical fiber loop in the optical turnaround housing.

6. The system as recited in claim 1, wherein the optical fiber housing is sealed to the optical fiber cable by an in-line splice.

* * * * *